United States Patent [19]

Mizushima et al.

[11] Patent Number: 4,593,391
[45] Date of Patent: Jun. 3, 1986

[54] MACHINE CHECK PROCESSING SYSTEM

[75] Inventors: Yoshihiro Mizushima, Kawasaki; Kazuyuki Shimizu, Machida, both of Japan

[73] Assignee: Fujitsu Limited, Kawasaki, Japan

[21] Appl. No.: 563,654

[22] Filed: Dec. 20, 1983

[30] Foreign Application Priority Data

Dec. 29, 1982 [JP] Japan ................... 57-229290

[51] Int. Cl.⁴ .............................. G06F 11/00
[52] U.S. Cl. ............................. 371/15; 371/18; 371/29; 371/13; 364/200
[58] Field of Search ............... 371/15, 13, 18, 38, 371/29, 16; 364/200, 900

[56] References Cited

U.S. PATENT DOCUMENTS

| | | | |
|---|---|---|---|
| 4,212,059 | 7/1980 | Sato | 371/18 |
| 4,225,958 | 9/1980 | Funatsu | 371/15 |
| 4,315,311 | 2/1982 | Causse et al. | 371/18 |
| 4,355,389 | 10/1982 | Sato | 371/18 |
| 4,395,755 | 7/1983 | Wakai | 371/18 |
| 4,463,418 | 7/1984 | O'Quin, II et al. | 371/15 |
| 4,506,362 | 3/1985 | Morley | 371/38 |

*Primary Examiner*—Michael R. Fleming
*Attorney, Agent, or Firm*—Staas & Halsey

[57] ABSTRACT

A machine check processing system which includes: an error correcting circuit for correcting a correctable error generated during data processing; an error data storage for storing error data which relates to the correctable error; a central processing unit (CPU) for controlling the error correcting circuit and the error data storage; and a service processing unit (SVP) for operating and controlling the error correcting circuit, the error data storage, and the CPU. The CPU includes an error data freezing circuit for freezing error data stored in the error data storage when a correctable error occurs, and a machine check record request signal generator for generating a machine check record request signal when a correctable error occurs. The SVP comprises an error data saving device for carrying out a saving process to save the frozen error data stored in the error data storage in response to the machine check record request signal, an error data analyzing circuit for carrying out an error analyzing process and a freeze release circuit for releasing the error data stored in the error data storage from a frozen state after the error data saving device saves the error data. At least a part of the saving process and the error analyzing process are automatically carried out substantially simultaneously with the operation of the CPU, without a machine check interruption.

9 Claims, 2 Drawing Figures

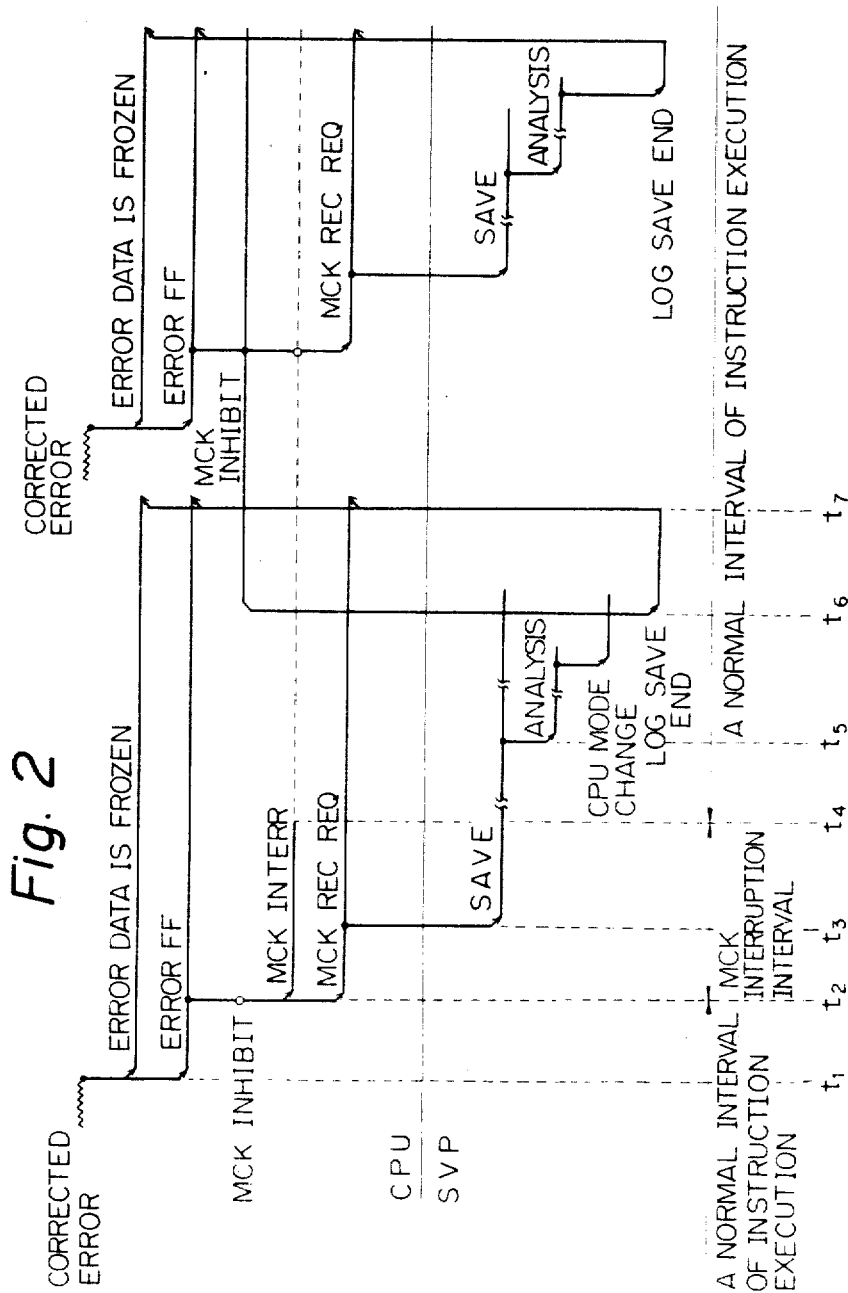

MACHINE CHECK PROCESSING SYSTEM

BACKGROUND OF THE INVENTION

1. Field of the Invention

The present invention relates to a machine check processing system. More particularly, it relates to a system having an error correcting function, wherein error data relating to a corrected error can be saved by a service processing unit (SVP) without substantially interrupting the system processing and the SVP can inhibit machine check interruption based on an analysis of the saved error data.

2. Description of the Prior Art

A known data processing system has a main memory, a memory control unit (MCU), a central processing unit (CPU), and an SVP. When a correctable error, for example, a single bit error, occurs during data processing, the error is corrected in the MCU. Further, in the prior art, a predetermined area in the main memory receives information (error data) relating to the single bit error, for example, the place where the single bit error occurred. The error data is stored for the purpose of providing information about the site of the single bit error to prevent problems. If the single bit error is a hard error, the possibility of an uncorrectable error, i.e., a double bit error, occurring is high. Therefore, an operator, a user, or a maintenance man needs to know the place where the single bit error occurred.

There are, however, various problems in storing error data in a predetermined area in the main memory. First, since the predetermined area in the main memory is not a large area, it cannot store a large number amount of error data. Therefore, the error data must be saved in another place or must be output to an outer device everytime the predetermined area is full of error data. This saving or outputting process is very troublesome for the user.

Second, a machine check interruption occurs during every period in which error data is stored in the predetermined area in the main memory so that data processing is interrupted during that period. In a conventional machine, to avoid machine check interruption everytime a single bit error is detected, once single bit errors have been detected several times, for example, four times, the predetermined area in the main memory is not informed of any subsequent error data so that a machine check interruption due to a single bit error does not occur after several single bit errors occur. By this method, however, the maintenance man, etc. cannot discover the site of subsequent single bit errors after several single bit errors occur.

SUMMARY OF THE INVENTION

An object of the present invention is to provide a machine check processing system in which error data relating to a corrected error can be automatically saved and analyzed by an SVP without substantially interrupting the system processing.

Another object of the present invention is to provide such a machine check processing system as above, wherein a maintenance man, etc. can obtain error data even after a machine check interruption due to a single bit error is inhibited.

To attain the above objects, there is provided, according to the present invention, a machine check processing system which includes: an error correcting circuit for correcting a correctable error generated during data processing; error data storage for storing error data which relates to the correctable error; a CPU for controlling the error correcting circuit and the error data storage; and an SVP for operating and controlling the error correcting circuit, the error data storage, and the CPU. The CPU includes an error data freezing circuit for freezing the error data stored in the error data storage when a correctable error occurs and a machine check record request signal generator for generating a machine check record request signal when a correctable error occurs. The SVP includes an error data saving device for carrying out a saving process so as to save the frozen error data stored in the error data storage in response to the machine check record request signal, an error data analyzing circuit for carrying out an error analyzing process and a freeze release circuit for releasing the error data stored in the error data storage from its frozen state after the error data saving device saves the error data, whereby at least a part of the saving process and the error analyzing process are carried out substantially simultaneously with the operation of the CPU.

BRIEF DESCRIPTION OF THE DRAWINGS

The above objects and features, as well as other advantages, of the present invention will be more apparent from the following description of the preferred embodiment when read in conjunction with the accompanying drawings, wherein:

FIG. 2 is a time chart for the operation flow of the machine check processing system of FIG. 1.

DESCRIPTION OF THE PREFERRED EMBODIMENT

Figure 1:
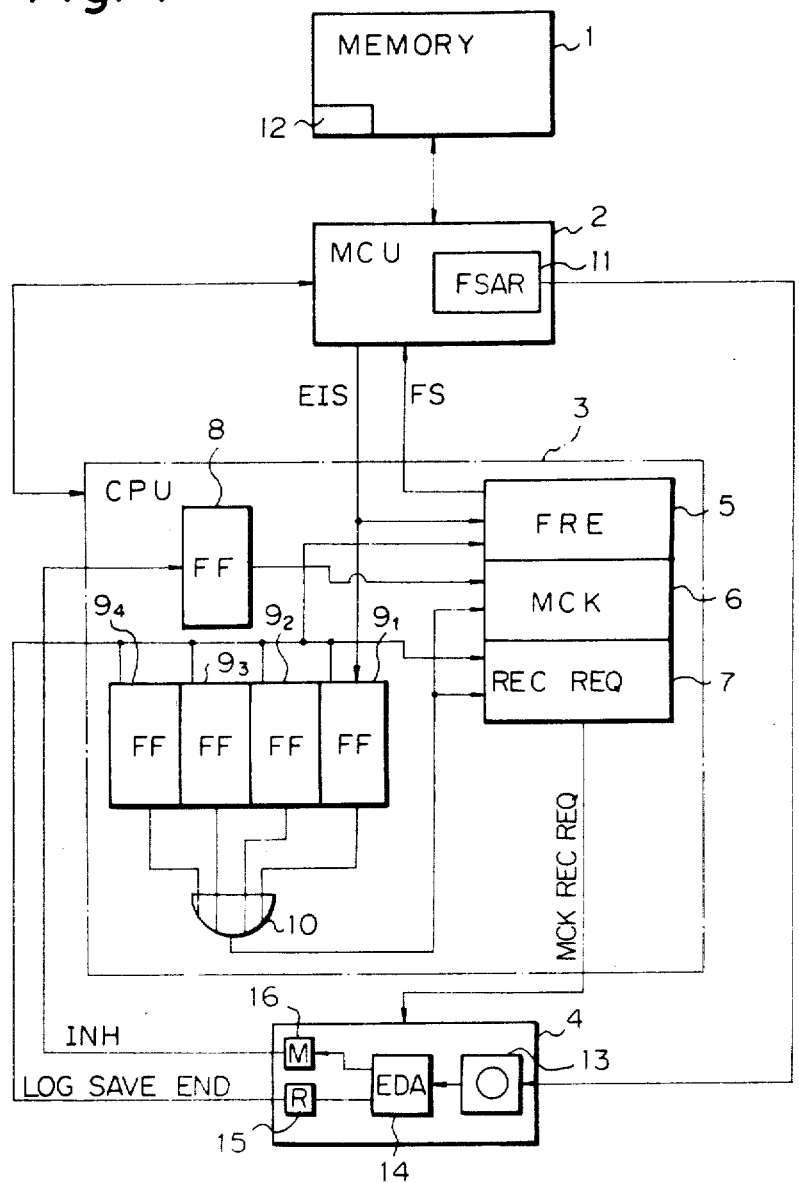
FIG. 1 is a block diagram of a machine check processing system according to an embodiment of the present invention.

FIG. 1 illustrates a machine check processing system according to an embodiment of the present invention. In FIG. 1, reference numeral 1 designates a main memory 1, 2 an MCU, 3 a CPU, and 4 an SVP including a system console. Within the CPU 3 and 5 an error data freezing circuit (FRE), 6 a machine check interruption circuit (MCK), 7 a machine check record request signal generating circuit (REC REQ), 8 an inhibiting flip-flop for inhibiting a machine check interruption, $9_1$ through $9_4$ error flip-flops for latching errors in the main memory, the CPU, or other places, and 10 an OR circuit. The MCU 2 includes a failing storage address register (FSAR) 11 for storing error data relating to a corrected error. A fixed area 12 is located in the main memory 1. Included in the SVP 4 are 13 a floppy disk for saving the error data from FSAR 11, 14 an error data analyzing circuit (EDA), 15 a freeze release circuit (R), and 16 a CPU mode changing circuit (M).

The operation of the system of FIG. 1 is described with reference to the time chart in FIG. 2. In a normal system operation, the CPU 3 accesses the main memory 1 through the MCU 2 to execute instructions. When a correctable error, i.e., a single bit error, occurs in the main memory 1, the CPU 3, or other places, the MCU 2 corrects the single bit error, stores error data such as the site of the single bit error in the FSAR 11, and sends an error informing signal (EIS) to the FRE 5 and to one of the error flip-flops $9_1$ through $9_4$. The error flip-flops $9_1$ through $9_4$, respectively, correspond to the main memory 1, the CPU 3, and other places. Therefore, if the single bit error occurs in the main memory 1, the EIS is received by the flip-flop $9_1$. The error data freezing circuit 5, when it receives the EIS, provides a freezing signal (FS) to the FSAR 11 so that the error data stored in the FSAR 11 is frozen at a time $t_1$. As a result, while the error data in the FSAR 11 is frozen, it is not changed even if another subsequent single bit error occurs. The error flip-flop $9_1$, when it receives the EIS, provides a trigger through the OR circuit 10 to the MCK 6 and REC REQ 7 at a time $t_2$. The MCK 6, when it receives the trigger from one of the error flip-flops, $9_1$ for example, causes the CPU 3 to carry out a machine check interruption for the single bit error so that the error data stored in the FSAR 11 is saved in the fixed area 12 as in the conventional way.

If the fixed area 12 is large, the remaining area in the main memory 1 used for data processing is limited. Therefore, the fixed area 12 should not be large, and, usually, it can store only one piece of error data relating to a single bit error. In a conventional system, a maintenance man can obtain error data only when he reads the contents in the fixed area 12 of the main memory every time the fixed area 12 is full of error data. If only one piece of error data fits, this reading must occur for every error to provide the error data.

The machine check interruption process may be considered to be unnecessary in the present invention. However, during a transition period, a maintenance man, etc. may handle a single bit error in the conventional way or in the way according to the present invention. Therefore, it is preferable to provide a machine check interruption process for outputting the contents stored in the FSAR 11 to the fixed area 12.

According to the present invention, the REC REQ 7, when it receives the trigger from one of the error flip-flops, $9_1$ for example, provides a machine check record request signal (MCK REC REQ) to the SVP 4 at a time $t_3$. When the SVP 4 receives the MCK REC REQ from the REC REQ 7, the floppy disk 13 in the SVP 4 starts to save the error data frozen in the FSAR 11 in the MCU 2 at the time $t_3$. When the machine check interruption for the single bit error is terminated at a time $t_4$, the CPU again starts a normal system operation subsequent to the operation in which the single bit error occurred. In the SVP, the error data analyzing circuit 14 starts to analyze the error data saved in the floppy disk 13 at a time $t_5$. It should be noted that the error data analyzing process and a part of the saving process are automatically carried out simultaneously with the above-mentioned subsequent system operation by the CPU 3 unless a system down status is assumed.

As a result of error data analysis, if the error is recognized as being a kind of error that does not necessitate a machine check interruption, the error data analyzing circuit 14 drives the CPU mode changing circuit 16 so that it provides an inhibit signal to the inhibiting flip-flop 8 in the CPU 3. For example, if the analyzed error data indicates that the site of the error is the same as the site of a previously saved error, the error is recognized as being a hard error. In this case, a machine check interruption is no longer necessary. The only necessary step is to inform a maintenance man of the presence of a hard error and request him to repair the hard error or to replace the memory chip having the hard error. This step can be carried out by the SVP 4 without machine check interruption. Thus, the inhibiting flip-flop 8, when it receives the inhibit signal INH from the circuit 16, provides the inhibit signal INH to the machine check interruption circuit 6 at a time $t_6$ so that, after at time $t_6$, the machine check interruption is inhibited. In other words, at the time $t_6$, the mode of the CPU 3 is changed from a state where a machine check interruption occurs every time a single bit error is detected to a state where no machine check interruption occurs when a single bit error is detected.

After the time $t_6$, the error analyzing circuit 14 drives the freeze release circuit 15 so that it provides a log save end signal (LOG SAVE END) to the error flip-flops $9_1$ through $9_4$, the REC REQ 7, and the error data freezing circuit 5 in the CPU 3 to reset them at a time $t_7$. Thus, the outputs of the FRE 5, the REC REQ 7 and the inhibiting flip-flop 8 are turned off so that the error data stored in the FSAR 11 is no longer frozen. After the time $t_7$, when a single bit error is detected and corrected by the MCU 2, no machine check interruption occurs. Data processing by the CPU 3 and error analyzing by the SVP 4 are carried out in parallel, as illustrated in the right half of FIG. 2.

In the foregoing embodiment, a machine check interruption is inhibited when the site of the corrected error is the same as the site of a previously corrected error. The present invention, however, is not limited to the above case. Under the operator control, any condition resulting from error analysis may cause inhibition of machine check interruption. Further, before the time $t_6$, a machine check interruption may occur every time a predetermined number of single bit errors are detected instead of when every single bit error is detected.

From the foregoing description, it will be apparent that, according to the present invention, an improved machine check processing system is obtained in which error data relating to a corrected error can be automatically saved and analyzed by an SVP without substantially interrupting the system processing. Further, the SVP can change the mode of the CPU from a state where a machine check interruption occurs everytime a single bit error is detected to a state where no machine check interruption occurs when a single bit error is detected.

We claim:

1. A machine check processing system, comprising:
   error correcting means for correcting a correctable error generated during data processing and identifying error data related to the correctable error;
   error data storing means, operatively connected to said error correcting means, for storing the error data realted to the correctable error;
   a central processing unit, operatively connected to said error correcting means and said error data storing means, for controlling said error correcting means and said error data storing means, comprising:
   error data freezing means, operatively connected to said error correcting means and said error data storing means, for freezing the error data stored in said error data storing means when the correctable error is corrected;
   machine check record request signal generating means, operatively connected to said error correcting means, for generating a machine check record request signal when the correctable error is corrected; and
   freeze release means, operatively connected to said error data freezing means, for subsequently releasing the error data; and a service processing unit operatively connected to said machine check record request signal generating means, for operating and controlling said error correcting means, said error data storing means and said central processing unit, comprising:
error data saving means, operatively connected to said error data storing means and said machine check record request signal generating means, for carrying out a saving process to save the error data stored in said error data storing means in response to the machine check record request signal; and
error data analyzing means, operatively connected to said error data saving means, for carrying out an error analyzing process, said freeze release means releasing the error data stored in said error data storing means after said error data saving means saves the error data, at least a part of the saving process and the error analyzing process being carried out substantially simultaneously with the operating of said central processing unit.

2. A machine check processing system as set forth in claim 1,
wherein said central processing unit further comprises machine check interruption means, operatively connected to said error correcting means and said error data storing means, for carrying out a machine check interruption process to output the error data stored in said error data storing means when the correctable error is corrected, and
wherein said machine check processing system further comprises a main memory, operatively connected to said error data storing means, having a fixed area for storing the error data.

3. A machine check processing system as set forth in claim 2, wherein said service processing unit further comprises machine check interruption inhibiting means, operatively connected to said machine check interruption means, for inhibiting the machine check interruption process after said error data analyzing means determines that the error data of the correctable error matches the error data of a previously generated correctable error.

4. A machine check processing system as set forth in claim 3, wherein at least a part of the saving process and the error analyzing process are carried out after the machine check interruption process is completed.

5. A machine check processing system, comprising:
error correcting means for correcting a correctable error generated during data processing and identifying error data related to the correctable error;
error data storing means, operatively connected to said error correcting means, for storing the error data;
machine check means, operatively connected to said error correcting means and said error data storing means, for freezing and subsequently releasing the error data in said error data storing means and generating a machine check record request signal, when said error correcting means identifies the error data;
error saving means, operatively connected to said error data storing means and said machine check means, for saving the error data stored in said error data storing means when the machine check record request signal is generated, said machine check means releasing the error data after the saving of the error data; and
error analyzing means, operatively connected to said error saving means and said machine check means, for generating a log save end signal instructing said machine check means to release the error data in said error data storing means when the error data is saved in said error saving means, analyzing the error data and generating an inhibit signal to inhibit said machine check means from freezing the error data in said data storing means.

6. A method for processing a machine check interrupt in a data processing system, comprising the steps of:
(a) correcting correctable errors and identifying error data related to the correctable error;
(b) storing the error data in an error register;
(c) freezing the error data stored in step (b) and generating a machine check record request signal;
(d) saving the error data in a storage device when the machine check record request signal generated in step (c);
(e) releasing the error data frozen in step (c) when step (d) is completed;
(f) analyzing the error data saved in step (d); and
(g) inhibiting said freezing in step (c) for subsequent data in dependence upon said analyzing in step (f).

7. A method as recited in claim 6, wherein step (f) comprises the steps of:
(fi) determining whether the error data for a previous correctable error matches the error data stored in step (b); and
(fii) requesting execution of said inhibiting in step (g) when the error data for the previous correctable error matches the error data stored in step (b).

8. A method as recited in claim 6, wherein step (f) comprises the steps of:
(fi) determining whether the error data for a predetermined number of previous correctable errors match the error data stored in step (b); and
(fii) requesting execution of said inhibiting in step (g) when the error data for the predetermined number of the previous correctable errors match the error data stored in step (b).

9. A method as recited in claim 6, wherein the the data processing system has a main memory and step (f) comprises the steps of:
(fi) determining whether the correctable error did not occur in the main memory; and
(fii) requesting execution of said inhibiting by step (g) if the correctable error did not occur in the main memory.

* * * * *

UNITED STATES PATENT AND TRADEMARK OFFICE
CERTIFICATE OF CORRECTION

PATENT NO. :  4,593,391
DATED      :  June 3, 1986
INVENTOR(S):  Mizushima et al.

It is certified that error appears in the above-identified patent and that said Letters Patent is hereby corrected as shown below:

Col. 4, line 1, "at" (second occurrence) should be --the--;

line 50, "realted" should be --related--.

Col. 6, line 52, "the the" should be --the--.

Signed and Sealed this

Fourteenth Day of October, 1986

[SEAL]

Attest:

DONALD J. QUIGG

Attesting Officer

Commissioner of Patents and Trademarks